United States Patent [19]

Warthen

[11] 4,345,445
[45] Aug. 24, 1982

[54] FLEXIBLE DRILL CHUCK DRIVE

[76] Inventor: Daniel E. Warthen, 1019 Premont St., Pontiac, Mich. 48053

[21] Appl. No.: 111,861

[22] Filed: Jan. 14, 1980

[51] Int. Cl.³ .............................................. F16C 1/02
[52] U.S. Cl. .................................... 279/62; 464/162; 464/178
[58] Field of Search ............... 64/2 R, 4; 279/60, 61, 279/62, 63, 64, 65

[56] References Cited

U.S. PATENT DOCUMENTS

| 1,056,940 | 3/1913 | Raybuck | 64/2 R |
| 1,138,926 | 5/1915 | Bernett | 64/2 R |
| 1,575,307 | 3/1926 | Bachmann | 64/2 R |
| 1,595,388 | 8/1926 | Elliott | 64/2 R |
| 1,815,594 | 7/1931 | Shaw et al. | 64/2 R |
| 1,985,586 | 12/1934 | Stone | 279/64 |
| 1,995,421 | 3/1935 | Goldberg | 64/2 R |
| 2,090,174 | 8/1937 | Albright | 64/2 R |
| 2,305,895 | 12/1942 | Pearson | 77/15 |
| 2,412,705 | 12/1946 | Jaques | 64/2 R |
| 2,477,681 | 8/1949 | Anderson | 60/60 |
| 2,545,282 | 3/1951 | Jenny | 120/36 |
| 2,683,341 | 7/1954 | Kock | 64/2 R |
| 2,711,199 | 6/1955 | Salsberg | 144/104 |
| 2,747,384 | 5/1956 | Beam | 64/2 |
| 3,680,877 | 8/1972 | Happe | 279/62 |
| 3,702,705 | 11/1972 | Sohadzich | 279/62 |
| 4,062,412 | 12/1977 | McIlvanie | 64/2 R |
| 4,083,571 | 4/1978 | Schadzich et al. | 279/61 |

Primary Examiner—Ira S. Lazarus
Attorney, Agent, or Firm—Basile, Weintraub & Hanlon

[57] ABSTRACT

A flexible shaft drive for drill chucks is disclosed. The flexible drive of the present invention comprises a flexible shaft for extending between an electric drill and a chuck for holding drills or other tools. A support sleeve is provided which encircles the chuck for rotatably supporting the chuck during use. In a preferred embodiment a bearing is interposed the chuck and the sleeve to aid in supporting the chuck during use.

1 Claim, 3 Drawing Figures

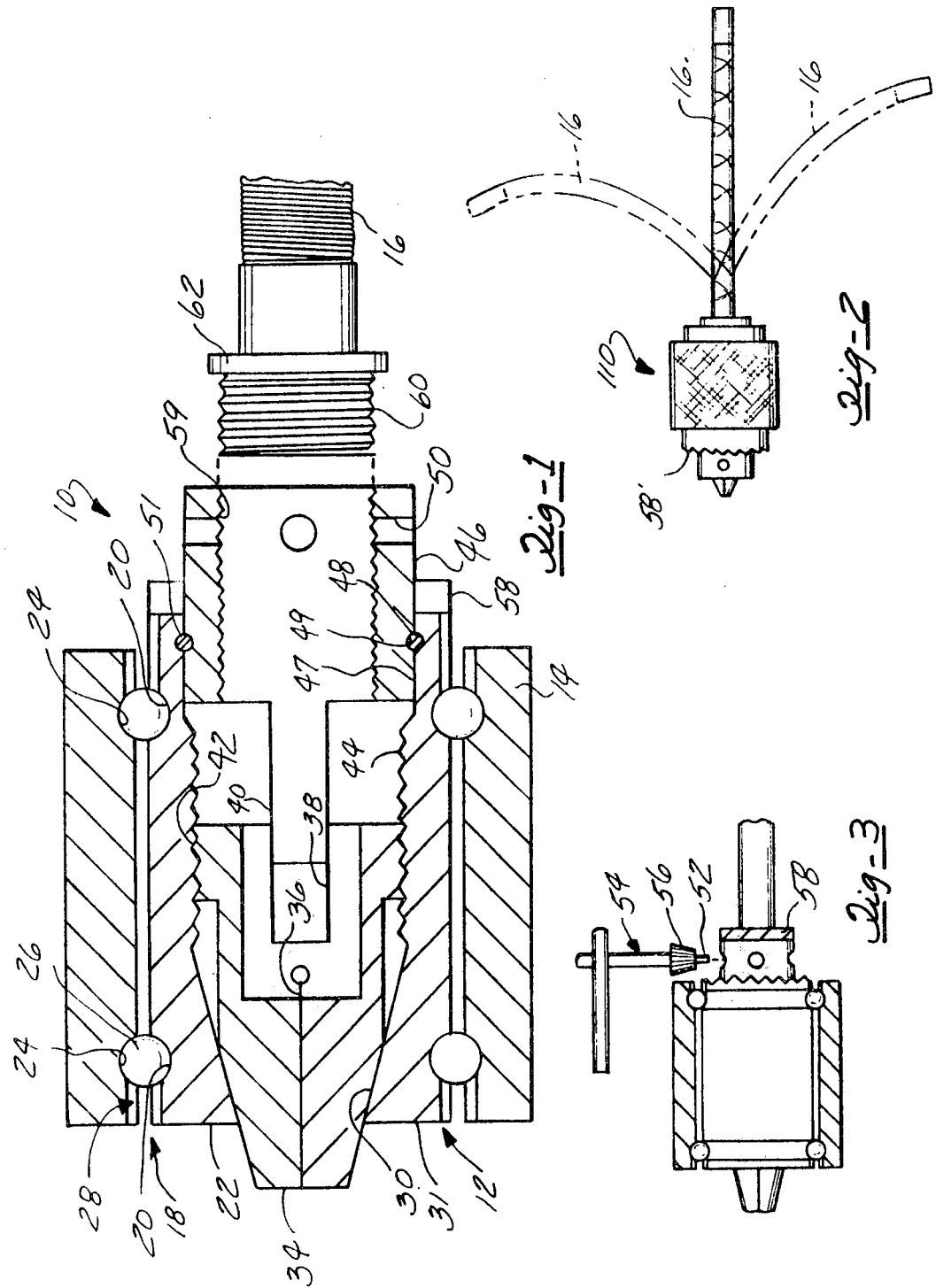

FLEXIBLE DRILL CHUCK DRIVE

BACKGROUND OF THE INVENTION

I. Field of the Invention

The present invention generally relates to the field of flexible shafts, and in particular, the present invention is concerned with the field of flexible shafts for driving a chuck which may accommodate a variety of rotary tools. Even more particularly the present invention is concerned with the field of flexible shaft drives having a chuck that is rotatably during use supported by a non-rotating sleeve.

II. Description of the Prior Art

Flexible drive shafts have long been in use, and flexible shafts for use with hand held electric drills are disclosed in U.S. Pat. Nos. 2,305,895; 2,711,199; and 2,747,384. U.S. Pat. No. 2,545,282 discloses an erasing device which employs an enclosed flexible shaft for directing power from a power source to an erashead. U.S. Pat. No. 2,477,681 discloses a flexible drive shaft for use with an electropneumatic power unit. These patents are relevant to the Applicant's invention in that they represent the closest prior art for utilizing a flexible shaft in association with a portable power source such as an electric drill.

III. Prior Art Statement

The aforementioned prior art, in the opinion of the Applicant and his Attorney, represents the closest prior art of which the Applicant and his Attorney are aware.

SUMMARY OF THE INVENTION

The present invention which will be described in greater detail subsequently, comprises a flexible shaft for use with hand held electric drills which at one end is connected to the rotary output of the electric drill and at another end is rotatably connected to a chuck for releasably engaging and rotatably driving a variety of tools such as drills, rotary files, screwdrivers, and the like. In a preferred embodiment the chuck is rotatably supported by a support sleeve which encircles the chuck for conveniently supporting the chuck during use. The preferred embodiment includes a pair of opposed and aligned arcuate grooves formed along the periphery of the inside diameter of the sleeve and the outside diameter of the chuck are filled with balls to form a ball bearing which enables the sleeve to rotatably support the chuck in an efficient manner.

It is therefore a primary object of the present invention to provide a new and improved flexible shaft drive for hand drills.

It is a further object of the present invention to provide a new and improved flexible shaft drive for hand drills which permits rotary operations such as drilling to be performed in confined spaces offset from the electric drill center.

It is a further object of the present invention to provide a flexible shaft drive for hand held drills that includes a support sleeve for rotatably supporting the output end of the flexible shaft.

It is yet another object of the present invention to provide a flexible shaft drive for hand held drills that provides support for the tool at the work surface.

Further objects, advantages, and applications of the present invention will become more apparent to those skilled in the art to which this invention pertains, when the accompanying description of one example of the best mode contemplated for practicing the invention is read in conjunction with the accompanying drawing.

BRIEF DESCRIPTION OF THE DRAWING

In the drawing like reference numbers refer to like parts throughout the several views, and wherein:

FIG. 1 illustrates a broken cross-sectional view of a preferred embodiment of the flexible drill chuck drive of the present invention;

FIG. 2 illustrates a top plan view of another embodiment of the present invention; and FIG. 3 illustrates a partial cross-sectional view of the device of FIG. 1 with a chuck key for securing tools to the chuck.

DESCRIPTION OF THE PREFERRED EMBODIMENT

Referring now to the drawing, and in particular FIG. 1, there is illustrated at 10 one example of the present invention in the form of a flexible shaft drive for electric drills comprising a chuck 12 including a support sleeve 14 for rotatably supporting the chuck during use, and a flexible shaft 16 which extends between an electric drill (not shown) and the chuck.

The flexible shaft drive further comprises a bearing means 18 interposed the chuck and the sleeve for rotatably and axially supporting the chuck which will be described subsequently. The bearing means 18 comprises a first pair of axially spaced grooves 20 formed in the outside diameter of a chuck sleeve 22 and a second pair of axially spaced arcuate grooves 24 aligned with the first grooves formed along an inside diameter of the support sleeve 14. A plurality of balls 26 are employed to fill the grooves 20,24 and radially and axially support the chuck sleeve 22. Filling notches 28 are formed in the support sleeve 14 and the chuck sleeve 22 communicating with the grooves 20,24 to provide a path for insertion of the balls 26 during the assembly of the support sleeve 14 to the chuck sleeve 22.

The chuck 12 further comprises a tapered bore 30 formed inwardly from a forward end 31 of the chuck sleeve 22. Chuck jaws 34 having a tapered outside diameter complementary to the tapered bore 30 have a plurality of slits 36 formed between jaws to allow the jaws 34 to move radially in abutment with the tapered bore 30 as the jaws are moved axially. The jaws 34 are biased radially outward to insure engagement of the jaws with the tapered bore 30 throughout their excursion along the tapered bore. When the jaws 34 are displaced away from the forward end 31, the jaws are in their maximum opened position and as the jaws 34 are forced toward the forward end 31 they gradually assume a more closed position as they slide along the tapered bore 30. A driving notch 38 formed at an inner end of the jaws slidingly engages a driving tang 40 which rotatably drives the jaws 34. A threaded diameter 42 formed along an outside diameter of the jaws 34 threadingly engages a first threaded bore 44 formed in the chuck sleeve 22 to axially displace the jaws 34 inward and outward within the chuck sleeve 22. A driven bushing 46 is concentrically and rotatably supported by a bore 47 formed in the rearward end of the chuck sleeve 22. Retaining grooves 48, 49 are formed in the bore 47 and the driven bushing 46 to slidingly receive a retaining ring 51 which retains the driven bushing 46 against axial movement within the bore 47. A plurality of radial apertures 50 formed in the driven bushing 46 rotatingly accommodate an end 52 of a chuck key 54 (FIG. 3). The chuck key 54 includes a driving gear 56 which meshes with a driven gear 58 formed at the rearward end of the chuck sleeve 22, and rotation of the chuck key 54 causes a relative rotation of the driven bushing 46 and the jaws 34 in relation to the chuck sleeve 22 to induce movement of the jaws 34 along the tapered bore 30. Rotation of the key 54 in a first direction moves the jaws 34 toward closure, and rotation of the key 54 in a counter direction moves the jaws 34 toward the opened position. A second threaded bore 59 formed in the driven bushing 46 is configured to threadingly receive a threaded end 60 of the flexible shaft 16, and when engaged a collar 62 of the flexible shaft abuts the driven bushing to rotatably drive the driven bushing with the flexible shaft 16.

FIGS. 1 and 3 illustrate a chuck having a driven gear 58 disposed opposite the jaws 34. This configuration allows the support sleeve 14 to be axially positioned as close as possible to the chuck jaws 34 for optimum support of the chuck during use. The chuck sleeve of the present invention may also be employed with a conventional drill chuck as illustrated in FIG. 2 wherein the driven gear 58' is positioned at the jaw end of the chuck as illustrated at 110 of FIG. 2. FIG. 2 also illustrates how the flexible shaft 16 may be employed to deploy the chuck at varying angles relative to the axis of the electric drill (not shown). The outside diameter of the support sleeve 14 is optionally knurreled or roughened to enable the user to maintain a good grip on the chuck during use.

It can thus be seen that the present invention has provided a new and improved flexible drive for drill chucks. The design of the present invention is simple and economical to produce and may be utilized employing known production techniques.

It should be understood by those skilled in the art to which this invention pertains that other forms of the Applicant's invention may be had, all coming within the spirit of the invention and the scope of the appended claims.

Having thus described my invention what I claim is:
1. A flexible shaft drive for drill chucks comprising
a support sleeve encircling the chuck for rotatably supporting the chuck during use;
a bearing means interposed the chuck and the sleeve for rotatably and axially supporting the chuck, the bearing means comprising a first pair of axially spaced arcuate means comprising a first pair of axially spaced arcuate grooves formed around the chuck perimeter, a second pair of axially spaced arcuate grooves formed inside the sleeve aligned with the first pair of arcuate grooves, a filling notch formed in the support sleeve and the chuck communicating with the grooves to provide a path for insertion of a plurality of balls to support the sleeve in a spaced relationship from the chuck allowing the chuck to freely rotate while the user's hand grasps the sleeve, said balls contacting said sleeves and said chuck perimeter said balls and grooves allowing the sleeve to impose a radial and a thrust load on the chuck while the chuck is rotating;
said chuck further comprising a collet means for releasably grasping tools within the chuck including a tapered bore formed in the chuck, a plurality of tapered jaws having a tapered outer diameter complimentary to the tapered bore, said jaws joined at a large end of the tapered outer diameter, a plurality of axially extending radial slits between jaws, said jaws biased radially outward against the tapered bore so that axial movement of the jaws within the tapered bore causes radial movement of the jaws so that a tool may be radially grasped or released, a driving notch formed at said large end, a drive tang supported in a bushing bore engaging said driving notch, a threaded diameter formed along an outside diameter of the jaws, a threaded bore formed in the chuck threadingly engaging said threaded diameter so that rotation of said jaws relative to the chuck causes said jaws to displace inward or outward; with said driving notch and said tang providing a positive drive for said collet while allowing axial movement of said collet relative to said tang;
said support sleeve overlaying a substantial portion of said collet means with one of said first pair of axially spaced arcuate grooves positioned adjacent the tool to provide axial and radial tool support as close as possible to the tool;
a bushing bore formed in the chuck;
a driven bushing concentrically supported in the bushing bore, a first retaining groove formed in said driven bushing, a retaining ring slidingly filling said first and second retaining grooves preventing axial movement of said driven bushing relative to said bushing bore and allowing relative rotation between said driven bushing and said bushing bore, and a plurality of radial apertures formed at another end of said driven bushing to rotatingly accommodate an end of a chuck key, said chuck key including a driving gear, a driven gear formed at a rearward end of said chuck meshing with said driven gear; and
wherein rotation of said chuck key in one direction causes said jaws to move radially inward and rotation of said chuck key in a counter direction causes said jaws to move radially outward.

* * * * *